2,035,999

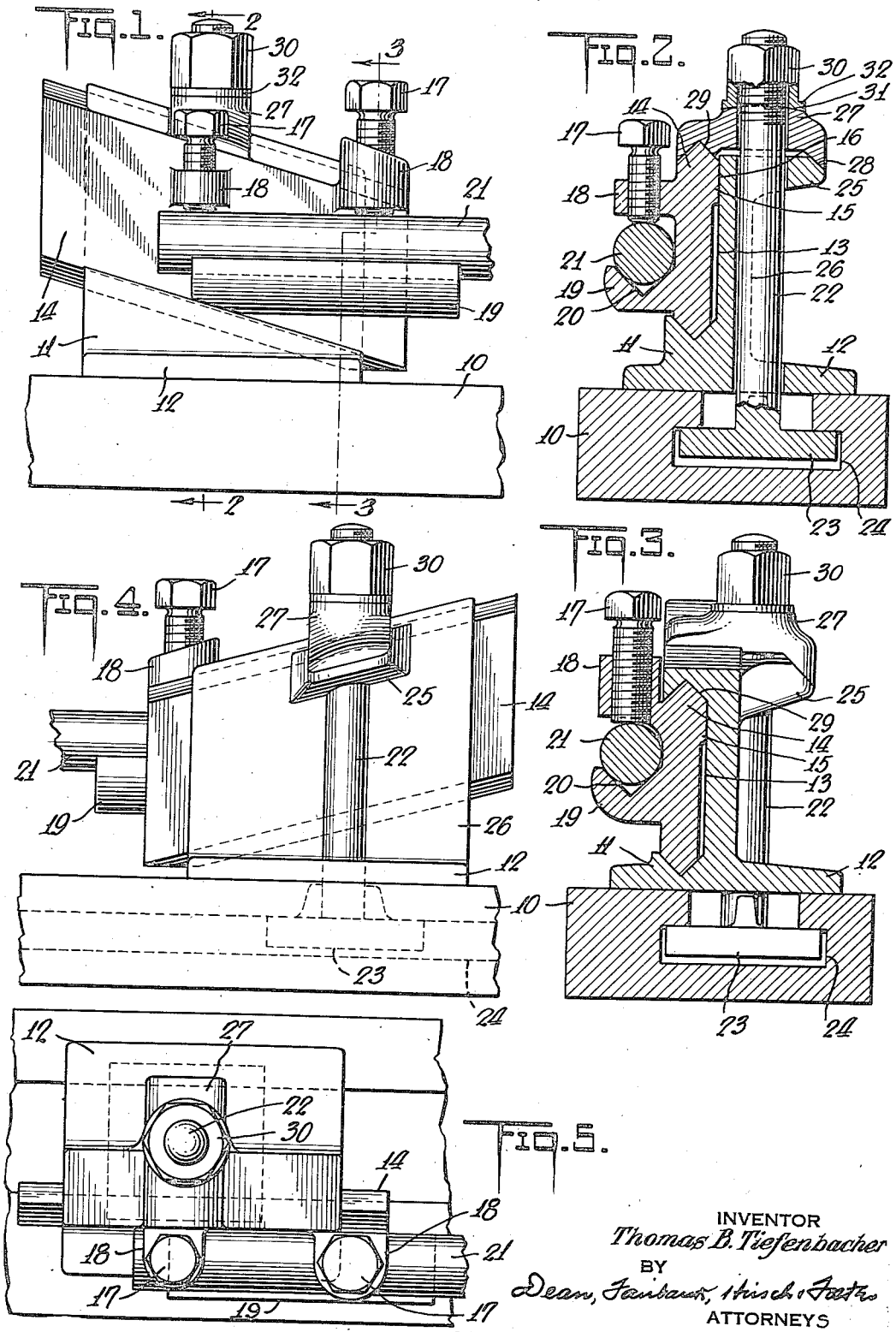
March 31, 1936.  T. B. TIEFENBACHER  2,035,999
TOOL HOLDER
Filed Nov. 10, 1934
INVENTOR
Thomas B. Tiefenbacher
BY
Dean, Fairbank, Hirsch & Foster
ATTORNEYS Patented Mar. 31, 1936

UNITED STATES PATENT OFFICE 2,035,999

TOOL HOLDER

Thomas B. Tiefenbacher, Paterson, N. J.

Application November 10, 1934, Serial No. 752,443

2 Claims. (Cl. 82—37)

The present invention relates to a tool holder such as may be used in a lathe for supporting a boring tool or a turning tool, and is an improvement on the general type of tool holder described and claimed in my prior Patent No. 1,647,590.

In this type of tool holder there is provided a tool carriage movable along a trackway, and carrying a tool support movable along an inclined guideway formed in said carriage, whereby the height of the operating end of the tool may be varied by sliding the tool support in selective positions. Also, in such a construction, the carriage is pivotally mounted so that it may be swiveled with respect to the trackway.

In my prior construction, there is provided means for clamping the carriage in adjusted position along the trackway, and separate and independent means for clamping the tool support in selective position on the carriage.

One object of the present invention is to provide simplified means for clamping the carriage and the tool support in selective positions.

As a feature of the present invention, I provide a single means for clamping both the carriage upon its trackway or bed plate, and the tool support on said carriage. By this arrangement, I am able to effect the clamping of these two members in adjusted position by a single manual operation.

In the specific embodiment of the invention, I provide a bolt which extends from the bed plate through the carriage and substantially across the entire height of said carriage, and which is provided at its upper end with means for clamping the carriage and the tool support downwardly in adjusted position. By having the clamping means on the top of the carriage rather than on the base portion of the carriage, the bolt may be positioned closer to the main body of the carriage, so that a more effective clamping action is effected. Furthermore, the clamping of the carriage and the tool support may be effected by a single manual operation.

In the accompanying drawing, there is shown for the purpose of illustration, one form of device embodying the present invention. In the drawing:—

Fig. 1 is a front view of a tool holder embodying the present invention,

Figs. 2 and 3 are sections taken on the line 2—2 and 3—3, respectively, of Fig. 1, Fig. 4 is a rear view of a tool holder embodying the present invention, and Fig. 5 is a top plan view of a tool holder embodying the present invention.

In the specific embodiment of the invention shown, there is provided a base or bed plate 10 forming a trackway for a tool carriage 11. This tool carriage is provided with a base flange 12 adapted to ride over the bed plate 10, and has an inclined slot 13 on one side thereof forming a guideway for a tool support 14. The base portion of the slot 13 is V-shaped as shown, to form a rail for the tool support 14, the lower edge of this tool support 14 being correspondingly V-shaped to fit into the base portion of said slot, and to ride over said rail.

The upper portion of the slot 13 is also V-shaped to receive the correspondingly shaped upper edge of the tool support 14. By means of this arrangement, the tool support 14 may be easily moved along the inclined guideway 13 while being held against transverse movement with respect to the tool carriage. If desired, the inner side of the tool support 14 may be provided with a ledge 15, the surface of which may be machined to contact with a corresponding machined surface 16 on the side of the tool carriage 11.

The tool support 14 is provided on the outer side thereof with a horizontally extending tool seat member 19 having a V-shaped tool seat 20 for receiving a suitable tool 21, such as a boring or turning tool. By means of this arrangement, the height of the operating end of the tool 21 may be moved into selective position merely by moving the tool support 14 along the inclined guideway 13. The tool 21 may be clamped in position in the tool seat 19 by means of a pair of set screws 17 adapted to impinge on the tool 21 and threaded into a pair of ears 18 extending outwardly from the outer side of the tool support 14.

The carriage 11 may be translated along the bed plate or trackway 10, and may be swiveled about a vertical axis. For that purpose, there is provided a bolt 22 having a rectangular head 23 at the lower end thereof extending into the base portion of a T-shaped guide slot 24 formed in the bed plate 10. This bolt extends through the base flange 12 on the tool carriage, and through an ear 25 disposed in the upper portion of the tool carriage. The bolt 22 is disposed very close to the main portion of the tool carriage 11. For that purpose, one side of the tool carriage is formed with a vertical groove 26 for receiving a portion of the bolt. By means of this construction, the carriage 11 may be translated along the trackway 10, and may be revolved about the bolt 22 into any selective angular position with respect to the axis of said bolt in accordance with the desired position of the tool 21.

As an important feature of the present invention, single means are provided for clamping the carriage 11 and the tool support 14 in selective positions. For that purpose, there is provided a clamping lug 27 loosely embracing the upper portion of the bolt 22 and formed on one side with a downwardly facing wedge surface 28 seated upon an upwardly facing inclined surface on the ear 25. The other side of this clamping lug 27 extends through a cut out portion of the tool carriage 11, and presents a downwardly facing V-shaped groove 29 adapted to seat upon the upper V-shaped portion of the tool support 14.

The lug 27 is clamped in position by means of a nut 30 threaded on to the upper end of the bolt 22. The lug 27 is preferably provided with a spherically curved nut seat 31, the lower end of the nut 30 being correspondingly curved so that a continuous surface contact is assured between the nut and the lug. The lower end of the nut 30 may be in the form of a washer 32 welded or otherwise secured to the main portion of the nut. By means of this construction, after the carriage 11 has been translated and rotated into any selective position on the trackway 10, and after the tool support 14 has been moved along its guideway to the desired position, the clamping of said tool carriage and said tool support is effected by the simple operation of tightening up the nut 30. This causes the clamping lug 27 to be jammed downwardly against the upper V-shaped edge of the tool support 14, and the wedge surface of the ear 25, thereby clamping the carriage and the tool support in adjusted position.

Having thus described my invention, what I claim as new and desire to secure by Letters Patent is:—

1. A tool holder comprising a tool carriage, a trackway for said tool carriage having a guide slot therein, said carriage presenting an inclined guideway, a tool support in said guideway, a bolt extending vertically through said tool support and having a head at the lower end thereof for movement along said guide slot, a clamping lug loosely embracing said bolt near the upper end thereof, and having a pair of clamping surfaces engaging the tool carriage and the tool support respectively, and a nut threaded on said bolt for forcing said clamping lug against said carriage and said tool support for clamping said carriage and said tool support in adjusted positions.

2. A tool holder including a tool carriage presenting an upwardly facing inclined surface at the upper end thereof, a bed plate forming a trackway for said tool carriage and having a guide slot for said tool carriage, said tool carriage being provided with an inclined slot forming a guideway, a tool support in said guideway, a vertical bolt having a head at the lower end thereof extending into said guide slot for guiding said tool carriage along said bed plate, and passing loosely through said tool carriage, whereby said carriage may be swiveled about said bolt, a clamping lug near the upper end of said bolt, presenting a downwardly facing wedge surface adapted to seat upon said inclined surface on said tool carriage, and having a downwardly facing clamping surface adapted to seat upon the upper edge of said tool support, and a nut threaded onto the upper end of said bolt for forcing said clamping lug against said tool support and said carriage for clamping said latter members in adjusted positions.

THOMAS B. TIEFENBACHER.